United States Patent
Roberge et al.

(10) Patent No.: US 12,041,883 B2
(45) Date of Patent: Jul. 23, 2024

(54) BALE WRAPPING SYSTEM

(71) Applicant: CNH Industrial America LLC, New Holland, PA (US)

(72) Inventors: Martin J. Roberge, Saskatoon (CA); Jonathan E. Ricketts, Davenport, IL (US); Jason Douglas McAuley Cousins, Saskatoon (CA)

(73) Assignee: CNH Industrial America LLC, New Holland, PA (US)

( * ) Notice: Subject to any disclaimer, the term of this patent is extended or adjusted under 35 U.S.C. 154(b) by 50 days.

(21) Appl. No.: 17/627,039

(22) PCT Filed: Jul. 16, 2020

(86) PCT No.: PCT/US2020/042323
§ 371 (c)(1),
(2) Date: Jan. 13, 2022

(87) PCT Pub. No.: WO2021/011767
PCT Pub. Date: Jan. 21, 2021

(65) Prior Publication Data
US 2022/0272904 A1    Sep. 1, 2022

Related U.S. Application Data

(60) Provisional application No. 62/874,851, filed on Jul. 16, 2019.

(51) Int. Cl.
*A01F 15/07*    (2006.01)
*A01F 15/08*    (2006.01)

(52) U.S. Cl.
CPC ...... *A01F 15/0715* (2013.01); *A01F 15/0816* (2013.01); *A01F 2015/0745* (2013.01); *A01F 2015/076* (2013.01); *A01F 2015/077* (2013.01)

(58) Field of Classification Search
CPC .... A01F 15/071; A01F 15/0715; A01F 15/08; A01F 15/0816; A01F 2015/0745;
(Continued)

(56) References Cited

U.S. PATENT DOCUMENTS 1,769,135 A  *  7/1930  Hendry .................. B65B 11/04
                                                         53/131.1
3,674,139 A     7/1972  Manasian et al.
(Continued)

FOREIGN PATENT DOCUMENTS

CA     2933770 A1    12/2017
CN     1110287 A     10/1995
(Continued)

OTHER PUBLICATIONS

International Search Report and Written Opinion for PCT Application No. PCT/US2020/042323 dated Jul. 18, 2020 (15 pages).
(Continued)

*Primary Examiner* — Stephen F. Gerrity
(74) *Attorney, Agent, or Firm* — Peter K. Zacharias; Rebecca L. Henkel; Rickard K. DeMille

(57) ABSTRACT

A bale wrapping system that includes a belt that rotates to form and drive rotation of a bale of an agricultural product. The bale is configured to be wrapped with a wrapping layer of a bale wrap while rotating on the belt. A first portion of the wrapping layer overlaps a second portion of the wrapping layer while disposed on the belt. A glue system sprays a layer of glue onto the wrapping layer. The layer of glue enables the first portion of the wrapping layer to couple to the second portion of the wrapping layer.

24 Claims, 8 Drawing Sheets

(58) Field of Classification Search
CPC ......... A01F 2015/076; A01F 2015/077; B65B 11/04; B65B 51/02; B65B 51/023
USPC .................................................. 53/131.1, 587
See application file for complete search history.

(56) References Cited

U.S. PATENT DOCUMENTS

| | | | | |
|---|---|---|---|---|
| 4,173,112 | A | * | 11/1979 | Meiners ................ A01F 15/071 53/118 |
| 4,205,514 | A | * | 6/1980 | Wolrab ............... A01F 15/0816 100/88 |
| 4,228,638 | A | | 10/1980 | Rabe et al. |
| 4,550,556 | A | | 11/1985 | Meiners |
| 4,859,480 | A | * | 8/1989 | Macfarlane et al. ........................ C09J 189/005 426/310 |
| 5,352,080 | A | | 10/1994 | Bakke |
| 5,361,561 | A | * | 11/1994 | Porter .................. A01D 85/001 53/580 |
| 5,727,359 | A | * | 3/1998 | Rampp .................... B65B 11/04 53/215 |
| 6,298,634 | B1 | * | 10/2001 | Cramer ................ B65B 25/148 53/410 |
| 7,165,491 | B2 | | 1/2007 | Viaud |
| 7,210,281 | B2 | | 5/2007 | Viaud |
| 7,644,559 | B2 | | 1/2010 | Smith |
| 7,954,633 | B2 | | 6/2011 | Anstey et al. |
| 9,198,354 | B2 | * | 12/2015 | Aerts et al. ......... A01F 15/0816 100/88 |
| 10,264,732 | B2 | | 4/2019 | Porter et al. |
| 2003/0056469 | A1 | * | 3/2003 | Armbruster ........... A01F 15/071 53/587 |
| 2004/0250694 | A1 | * | 12/2004 | Lynde ................ A01F 15/0816 100/8 |
| 2004/0250705 | A1 | | 12/2004 | Underhill |
| 2005/0079275 | A1 | * | 4/2005 | Nes et al. ............... A01F 25/13 427/372.2 |
| 2009/0223197 | A1 | | 9/2009 | Kohlbeck |
| 2011/0099966 | A1 | * | 5/2011 | Kraus ................. A01F 15/0816 56/341 |
| 2012/0042792 | A1 | * | 2/2012 | Smith ................. A01F 15/0715 100/2 |
| 2013/0160660 | A1 | | 6/2013 | Roberge |
| 2016/0177135 | A1 | | 6/2016 | Allen |
| 2016/0353665 | A1 | | 12/2016 | Hummel et al. |

FOREIGN PATENT DOCUMENTS

| | | |
|---|---|---|
| CN | 102647901 | 8/2012 |
| CN | 205320632 | 6/2016 |
| CN | 109121744 | 1/2019 |
| CN | 109220243 | 1/2019 |
| EP | 0531885 A1 | 3/1993 |
| EP | 1527674 A1 | 5/2005 |
| EP | 3338535 | 6/2018 |
| WO | 2013/124836 A1 | 8/2013 |
| WO | 2019129738 | 7/2019 |

OTHER PUBLICATIONS

Chinese Application No. 202080058350.7 Office Action dated Dec. 21, 2022, with translation, 20 pgs.
Chinese Application No. 202080058350.7 Office Action dated Jul. 18, 2023, with translation, 22 pgs.
EP Application No. 20841616.4 Extended Search Report dated Jul. 12, 2023.
CN Application No. 202080058350.7 Office Action dated Nov. 20, 2023 and translation, 15pgs.

* cited by examiner

BALE WRAPPING SYSTEM

BACKGROUND

The present disclosure relates generally to a bale wrapping system.

Agricultural balers or packagers are used to compress agricultural products (e.g., cotton) into rectangular or circular packages to facilitate storage, transport, and handling of the agricultural product. During the baling process, the agricultural product is compressed within a packaging chamber until the material forms a bale of a desired size and density. After forming the bale, the bale may be wrapped with a wrapping material that secures the agricultural product and generally maintains a shape of the bale. Unfortunately, the wrapping material is typically a plastic, such as plastic sheets or netting.

BRIEF DESCRIPTION

Certain embodiments commensurate in scope with the disclosed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In certain embodiments, a bale wrapping system that includes a belt that rotates to form and drive rotation of a bale of agricultural product. The bale is configured to be wrapped with a wrapping layer of a bale wrap while rotating on the belt. A first portion of the wrapping layer overlaps a second portion of the wrapping layer while disposed on the belt. A glue system sprays a layer of glue onto the wrapping layer. The layer of glue enables the first portion of the wrapping layer to couple to the second portion of the wrapping layer.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

The present disclosure includes a bale wrapping system for an agricultural implement. Certain agricultural implements (e.g., harvesters) are configured to harvest agricultural products (e.g., cotton, hay) and to form the agricultural product into bale (e.g., square, round). After forming the agricultural product into a bale, the bale wrapping system wraps the agricultural product with a bale wrap to secure the agricultural product and to generally maintain a shape of the bale. In certain embodiments, a bale wrap includes a wrapping layer that couples to itself with an adhesive (e.g., adhesive layer) that is sprayed onto the wrapping layer. The wrapping layer is configured to wrap around the bale, such that a first portion of the wrapping layer overlaps a second portion of the wrapping layer. The adhesive layer is sprayed onto the wrapping layer so that the first portion bonds to the second portion to secure the bale wrap around the bale. Bonding the first portion to the second portion of the wrapping layer with an adhesive enables the bale wrapping system to use a wrapping layer that comprises biodegradable materials (e.g., cotton).

The present disclosure also includes a wrap treatment system that may waterproof or otherwise treat the wrapping layer (e.g., pesticide treatment, anti-microbial). For example, the wrapping layer may be pre-treated with one or more chemicals or substances. The treatment may then be activated with the application of a fluid (e.g., sprayed fluid) that then activates the chemicals or substances, thereby enabling the treatment to protect the wrapping layer and/or the agricultural product.

Figure 1:
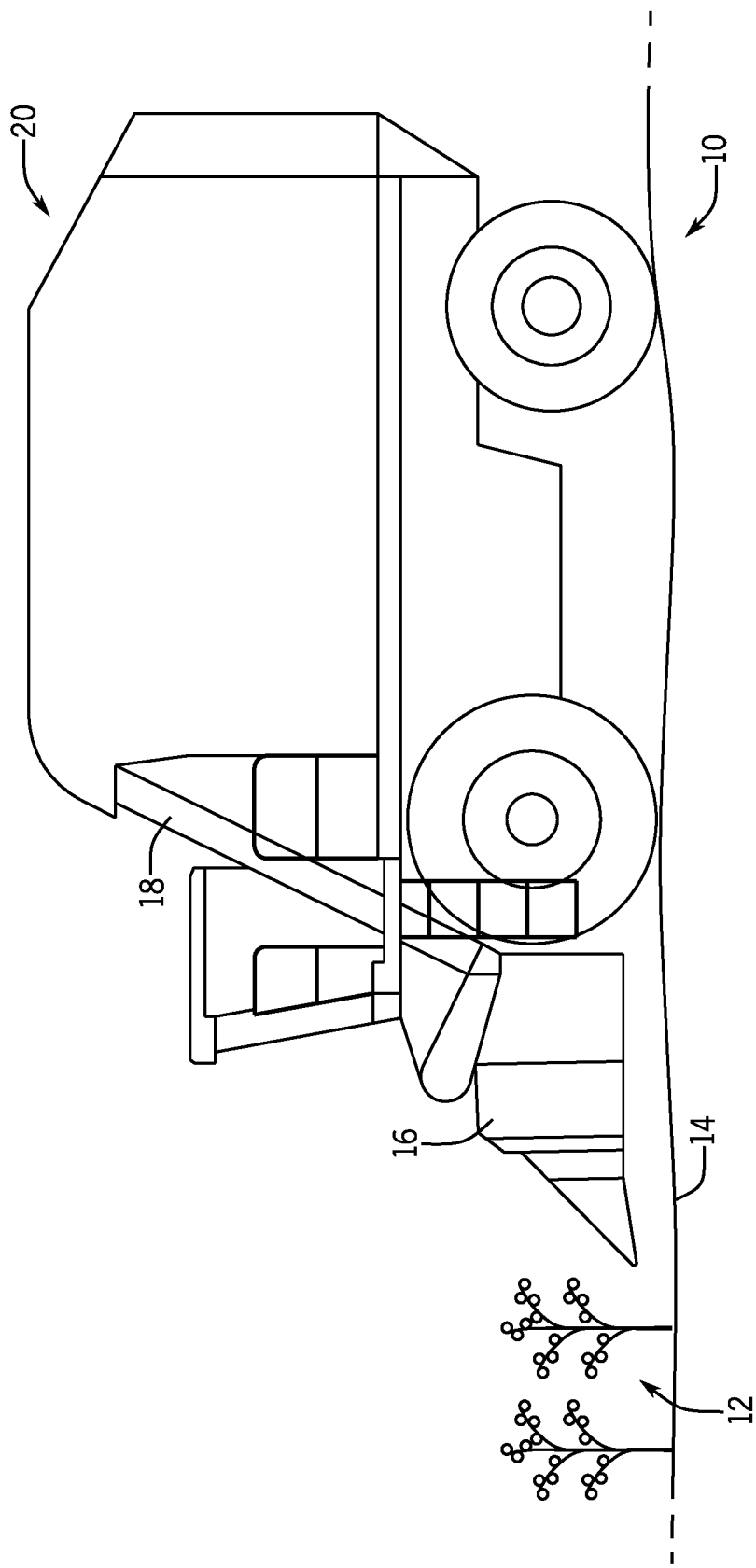
FIG. 1 is a side view of an embodiment of an agricultural implement, in accordance with an aspect of the present disclosure.

With the foregoing in mind, the present embodiments relating to bale wrapping systems may be utilized within any suitable agricultural implement. For example, FIG. 1 is a side view of an embodiment of an agricultural implement 10 (e.g., a harvester). The agricultural implement 10 is configured to harvest agricultural product 12 (e.g., cotton) from a field 14 and to form the agricultural product 12 into bales. For example, the agricultural implement 10 includes drums 16 configured to harvest the agricultural product 12 from the field 14. Additionally, the agricultural implement 10 includes a pneumatic system 18 configured to move the agricultural product 12 from the drums 16 to a packager or baler 20 (e.g., baler or module builder). The baler 20 is supported and/or mounted within or on the agricultural implement 10. As illustrated, the baler 20 may form the agricultural product 12 into round bales. In certain embodiments, the baler 20 of the agricultural implement 10 may form the agricultural product into square bales, round bales, among others. As described in greater detail below, after forming the agricultural product 12 into a bale, a bale wrapping system of the agricultural implement 10 wraps the agricultural product 12 with a bale wrap to secure the agricultural product 12 and to generally maintain a shape of the bale.

Figure 2:
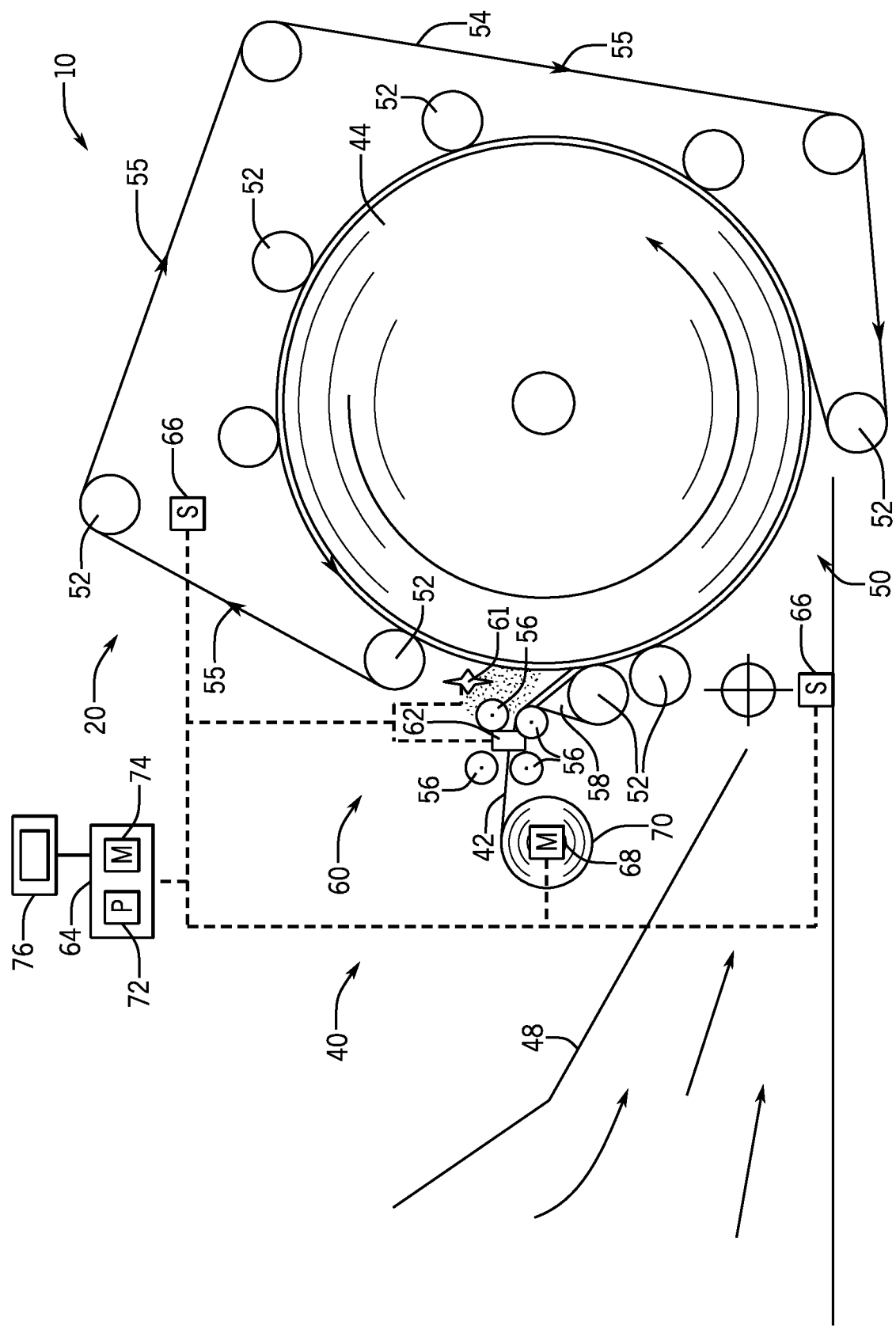
FIG. 2 is a schematic view of a bale wrapping system that may be employed in the agricultural implement of FIG. 1, in accordance with an aspect of the present disclosure.

FIG. 2 is a side view of an embodiment of a bale wrapping system 40 that may be employed in the baler 20 of FIG. 1. A bale wrap 42 is configured to wrap around a bale 44 (e.g., a bale of the agricultural product or a module of the agricultural product) formed by the packager or baler 20 of the agricultural implement 10. As cotton or another agricultural product is harvested, the agricultural product flows into an accumulator or storage housing 48. For example, cotton may be blown by the pneumatic system 18 (seen in FIG. 1) into the accumulator 48. The cotton is then fed into a cavity 50 of the baler 20. The baler 20 includes a plurality of rollers 52 that support and/or drive rotation of one or more belts 54. For example, one or more rollers or wheels 52 engage the belt 54, which moves the belt 54 along the pathway defined by the rollers 52. The belt 54 circulates around the path defined by the rollers 54, as indicated by arrows 55. The movement of the belt 54 captures agricultural product from the storage housing 48 and draws it into the cavity 50 where the agricultural product is gradually built up to form the bale 44. As the agricultural product builds within the cavity 50 one or more of the rollers 52 move radially outward to accommodate the increasing size of the bale 44.

Once the bale 44 reaches a desired size, the bale wrapping system 40 wraps the bale 44 with a bale wrap 42. The bale wrap 42 may include cotton and/or other suitable materials (e.g., biodegradable, natural materials). In certain embodiments, the bale wrap 42 may include only cotton. Additionally, the bale wrap 42 may be a canvas, a fabric, a cloth, another material configuration, or a combination thereof.

The bale wrap 42 is fed into contact with the bale 44 with one or more rollers and/or guides 56 and over a wrap guide or wrap applicator 58 (e.g., duckbill). The wrap guide 58 is configured to change position (e.g., rotate) in order to drive the bale wrap 42 into contact with the bale 44. Contact between the bale 44 and the bale wrap 42 enables the bale 44 to grip the bale wrap 42. The rotation of the bale 44 then draws the bale wrap 42 around the bale 44 wrapping the bale 44.

In order to couple the bale wrap 42 to itself around the bale 44, the bale wrapping system 40 includes a gluing or adhesive system 60. The gluing system 60 includes one or more sprayers 61 that spray an adhesive (e.g., TensorGrip 305, TensorGrip 307) onto the bale wrap 42 (e.g., one side of the bale wrap 42). The gluing system 60 adds an adhesive layer to the bale wrap 42 enabling the bale wrap 42 to couple to itself. In other words a first portion (e.g., first portion of a wrapping layer) of the bale wrap 42 couples (e.g., adheres) to a second portion (e.g., a backside and/or exterior surface of the wrapping layer that is wrapped around the bale 44) of the bale wrap 42 with the adhesive provided by the gluing system 60 as the first portion overlaps the second portion. The bale wrap 42 is then cut with a cutter or cutting system 62 to separate additional bale wrap 42 (e.g., a roll of bale wrap) from the bale wrap 42 surrounding the bale 44.

The cutting system 62 is configured to cut the bale wrap 42 to a suitable length for wrapping the bale 44. For example, the length of the bale wrap 42 may be selected based on a size of the bale 44 and the number of rotations that the bale wrap 42 is intended to wrap the bale 44, among other parameters. The cutting system 62 may include a cutting mechanism, an actuation assembly coupled to the cutting mechanism, and a track. The cutting mechanism may include a knife that engages the bale wrap 42 to cut the bale wrap 42. In other embodiments, the cutting mechanism may include other suitable mechanism(s) configured to cut the bale wrap (e.g., a rotary knife, a duckbill knife, a saw, a shear bar, etc.). In some embodiments, the actuation assembly is configured to move the cutting mechanism along a track to selectively drive the cutting mechanism into engagement with the bale wrap 42. In certain embodiments, the wrapping layer of the bale wrap 42 may have partially pre-cut sections (e.g., perforated sections), to facilitate cutting the bale wrap 42 by the cutting system 62.

The bale wrap 42 is configured to wrap around the bale 44 to secure the agricultural product and to generally maintain a shape of the bale 44, such as the round shape in the illustrated embodiment. In other embodiments, the shape of the bale 44 may be rectangular or another suitable shape. The bale wrapping system 40 may wrap the bale 44 once or multiple times. For example, the bale wrap 42 may form one layer, one layer and a portion of another layer, two layers, five layers, etc. around the bale 44. It should also be understood that the gluing system 60 may spray various lengths of the bale wrap 42. For example, the gluing system 60 may spray a portion of the bale wrap 42 that extends less than 0.25 rotations, 0.5 rotations, 0.75 rotations, 1 rotation of the bale 44. The sprayed portion of the bale wrap 42 may also be greater than a full turn of the bale 44 (e.g., 1.1 rotations, 1.25 rotations, 1.5 rotations, 2 rotations, 2.5 rotations, etc.). In some embodiments, the portion of the bale wrap 42 sprayed with the adhesive may be a specific length (e.g., 1 in., 6 in., 12 in., 24 in., 36 in., 72 in., 144 in., or more).

The agricultural implement 10 may include a controller 64. The controller 64 may be configured to control rotation of the belt 54 and/or a belt speed of the belt 54. For example, the controller 64 may control a rotation rate of one or more wheels or rollers 52 to control the rotational speed of the belt 54. For example, the controller 64 may emit a signal to one or more actuators that drive rotation of the rollers 52. The signal may increase or decrease the rotational speed of the rollers 52 to change the speed of the belt 54 and thus the rotational speed of the bale 44. The controller 64 may change the speed of the rollers 52 in response to feedback from one or more sensors 66. The sensors 66 may be detect flow rates of agricultural material, size of the bale 44, among others.

In addition to controlling the speed of the belt 54, the sensors 66 may enable the controller 64 to determine when to apply adhesive to the bale wrap 42. In some embodiments, once the bale 44 reaches a desired size the controller 64 may automatically activate a bale wrapping process. For example, the controller 64 may continuously receive signals from one or more sensors 66 indicative of the size of the bale 44 (e.g., a weight signal, a dimensional signal). Once the controller 64 detects a certain size of the bale 44, the controller 64 activates the bale wrapping system 40 to begin wrapping the bale 44. For example, the controller 64 may activate an actuator 68 coupled to a roll 70 to begin feeding the bale wrap 42. In some embodiments, the wrap guide 58 (e.g., duckbill) may be actuated (e.g., rotated) which drives the bale wrap 42 into contact with the bale 44. The contact between the bale wrap 42 and the bale 44 enables the bale 44 to grip the bale wrap 42 and draw the bale wrap 42 around the bale 44 as the bale 44 rotates.

The controller 64 may then monitor how much bale wrap 42 wraps around the bale 44 (e.g., 0.25 of a rotation, 0.5 of a rotation, 1 rotation, 1.1 rotations, 1.25 rotations, 1.5 rotations, 2 rotations, 2.5 rotations, etc.) with one or more sensors 66. Once a desired amount of wrapping is complete, the controller 64 then activates the gluing system 60. The controller 64 then controls how much glue is sprayed and/or how much bale wrap 42 is sprayed with glue (e.g., 0.25 of a rotation, 0.5 of a rotation, 1 rotation, 1.1 rotations, 1.25 rotations, 1.5 rotations, 2 rotations, 2.5 rotations, etc.). In some embodiments, depending on the size of the bale 44 the controller 64 may control the glue system 60 to spray more or less glue per section of bale wrap 42 and/or control how much of the bale wrap 42 is sprayed with glue. For example, if the bale 44 is small less glue may be used per section of bale wrap 42 and/or less bale wrap 42 may be sprayed. However, if the bale 44 is large more glue may be sprayed on a given section and/or more of the bale wrap 42 may be sprayed.

The controller 64 is configured to control movement and operation of the cutting system 62 as well. For example, the controller 64 may control engagement of a cutting mechanism with the bale wrap 42 such that the cutting mechanism cuts the bale wrap 42. As illustrated, the cutting system 62 may be upstream from the glue system 60 relative to the direction of movement of the bale wrap 42 as it unwinds from the roll 70. This may block and/or reduce glue from contacting and interfering with operation of the cutting system 62. Once cut the bale wrap 42 continues to rotate with the bale 44 enabling a glue sprayed portion of the bale wrap 42 to contact and adhere to the bale wrap 42 already surrounding the bale 44.

In certain embodiments, the controller 64 may control the glue system 60 and the cutting system 62, and belt speed (e.g., roller 52 speed) in sequence and/or simultaneously. For example, based upon a determination that the bale 44 is in condition for wrapping, the controller 64 may first signal the actuators controlling one or more rollers 52 to adjust the belt speed of the belt 54, such that the belt 54 reaches a target belt speed for wrapping the bale 44. The target belt speed may be greater than or less than a belt speed for bale formation. In certain embodiments, the belt speed may not be adjusted for wrapping the bale 44 (e.g., the target belt speed may be equal to the belt speed for bale formation). The controller 64 may determine that the bale 44 is in condition for wrapping based on a weight of the bale 44, a duration of the bale forming process, instructions from another controller (e.g., an implement controller) to wrap the bale 44, feedback from a bale size sensor, other factors, or a combination thereof. The controller 64 then outputs a signal to actuate the glue system 60. Simultaneously or a selected duration thereafter, the controller 64 may output a signal to the cutting system 62 to drive the cutting mechanism into engagement with the bale wrap 42, thereby enabling the cutting mechanism to cut the bale wrap 42. Thereafter, the controller 64 may output an output signal to the actuation assembly indicative of instructions to stop rotation of the belt 54. The wrapped bale 44 is then ejected from the agricultural implement 10.

As illustrated, the controller 64 of the bale wrapping system 40 includes a processor 72 and a memory 74. The processor 72 (e.g., a microprocessor) may be used to execute software, such as software stored in the memory 74 for controlling the bale wrapping system 40 (e.g., for controlling a rotation of the bale 44, the gluing system 60, the cutting system 62, etc.). Moreover, the processor 72 may include multiple microprocessors, one or more "general-purpose" microprocessors, one or more special-purpose microprocessors, and/or one or more application specific integrated circuits (ASICS), or some combination thereof. For example, the processor 72 may include one or more reduced instruction set (RISC) or complex instruction set (CISC) processors.

The memory 74 may include a volatile memory, such as random-access memory (RAM), and/or a nonvolatile memory, such as read-only memory (ROM). The memory 74 may store a variety of information and may be used for various purposes. For example, the memory 74 may store processor-executable instructions (e.g., firmware or software) for the processor 72 to execute, such as instructions for controlling the bale wrapping system 40. In certain embodiments, the controller 64 may also include one or more storage devices and/or other suitable components. The storage device(s) (e.g., nonvolatile storage) may include ROM, flash memory, a hard drive, or any other suitable optical, magnetic, or solid-state storage medium, or a combination thereof. The storage device(s) may store data, instructions (e.g., software or firmware for controlling the bale wrapping system 40), and any other suitable data. The processor 72 and/or the memory 74, and/or an additional processor and/or memory device, may be located in any suitable portion of the system.

Additionally, the bale wrapping system 40 includes a user interface 76 communicatively coupled to the controller 64. The user interface 76 may be configured to inform an operator of the position and/or the rotation rate of the bale 44, the speed of the belt 54, an amount of the bale wrap 42 remaining on the roll 70, a size of the bale 44, amount of glue remaining, or a combination thereof. Additionally, the user interface 76 may be configured to enable operator interactions with the bale wrapping system 40, such control of the gluing system 60, control of the cutting system 62, control of the belt 54, or a combination thereof. For example, the user interface 76 may include a display and/or other user interaction devices (e.g., buttons) configured to enable operator interactions.

Figure 3:
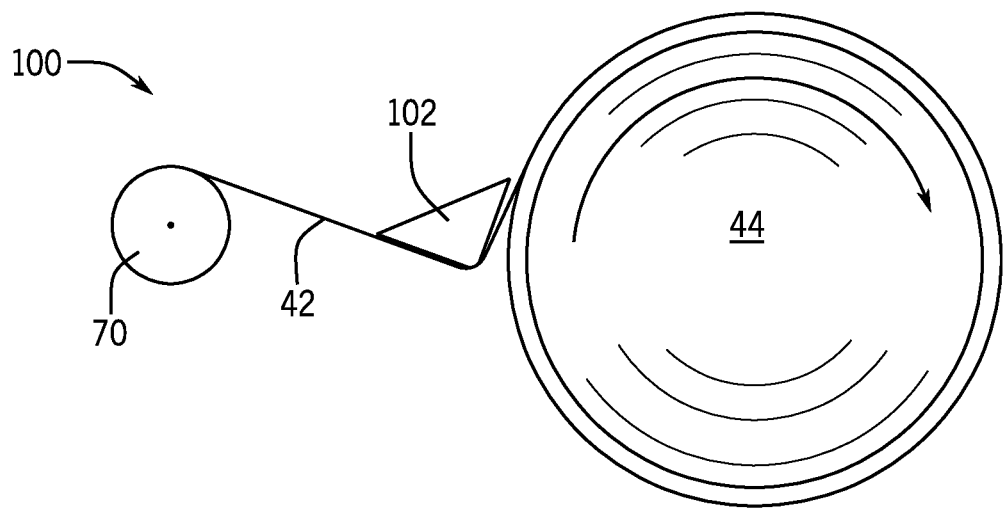
FIG. 3 is a schematic view of a bale wrapping system that may be employed in the agricultural implement of FIG. 1, in accordance with an aspect of the present disclosure.

FIG. 3 is a schematic view of a bale wrapping system 100 that may be employed in the agricultural implement 10 of FIG. 1. As illustrated, the bale wrap 42 is fed below a wrap guide 102. By feeding the bale wrap 42 below the wrap guide 102, the glue system 60 described above may incorporate the spray nozzles onto the wrap guide 102. In operation, the spray nozzles spray glue onto the bale wrap 42 enabling the bale wrap 42 to adhere to itself to secure the bale 44 before ejecting the bale 44 from the baler 20.

Figure 4:
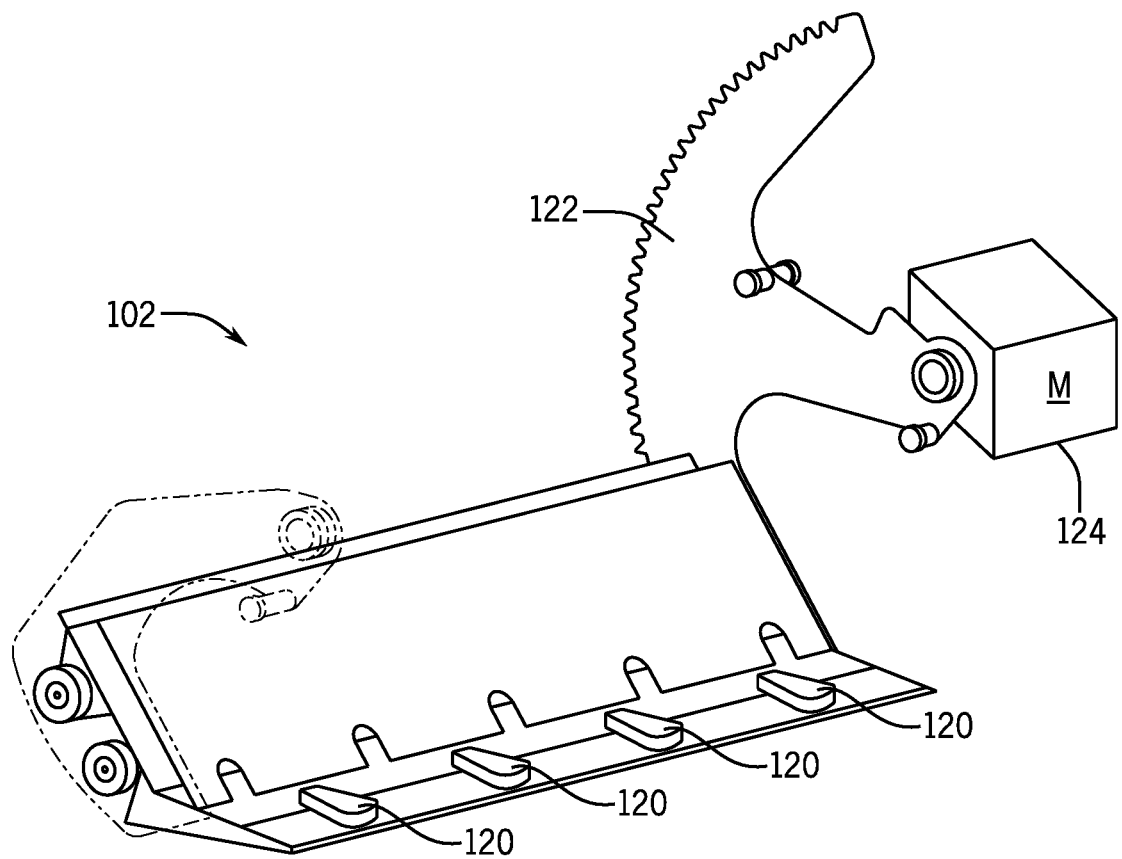
FIG. 4 is a perspective view of a wrap guide with spray nozzles, in accordance with an aspect of the present disclosure.

FIG. 4 is a perspective view of the wrap guide 102 with spray nozzles 120. As illustrated, one or more spray nozzles 120 may couple to the wrap guide 102 enabling the wrap guide 102 to simultaneously guide the bale wrap 42 into contact with the bale 44 as well as coat a portion of the bale wrap 42 with glue. The wrap guide 102 may include 1, 2, 3, 4, 5 or more spray nozzles 120. The spray nozzles 120 may be equally spaced, unequally spaced, aligned, and/or offset from each other. The spray nozzles 120 may also vary in size and or emit different amounts of glue during operation. For example, one or more spray nozzles 120 may be larger and emit more glue during operation than the remaining spray nozzles 120. In some embodiments, some of the nozzles 120 may spray glue while other spray nozzles 120 may spray other substances (e.g., chemicals, water). However, in some embodiments the spray nozzles 120 may all be the same size and emit the same or approximately the same amount of the same substance (e.g., glue, water, chemicals). The position of the wrap guide 102 relative to the bale 44 may be controlled with an actuator 122 in response to a motor 124 that couples to the actuator 122. In operation, the actuator 122 drives the wrap guide 102 towards and away from the bale 44 to enable the bale wrap 42 to contact the bale 44. Contact between the bale wrap 42 and the bale 44 enables the bale 44 to grip the bale wrap 42 and wrap itself as it rotates within the baler 20.

Figure 5:
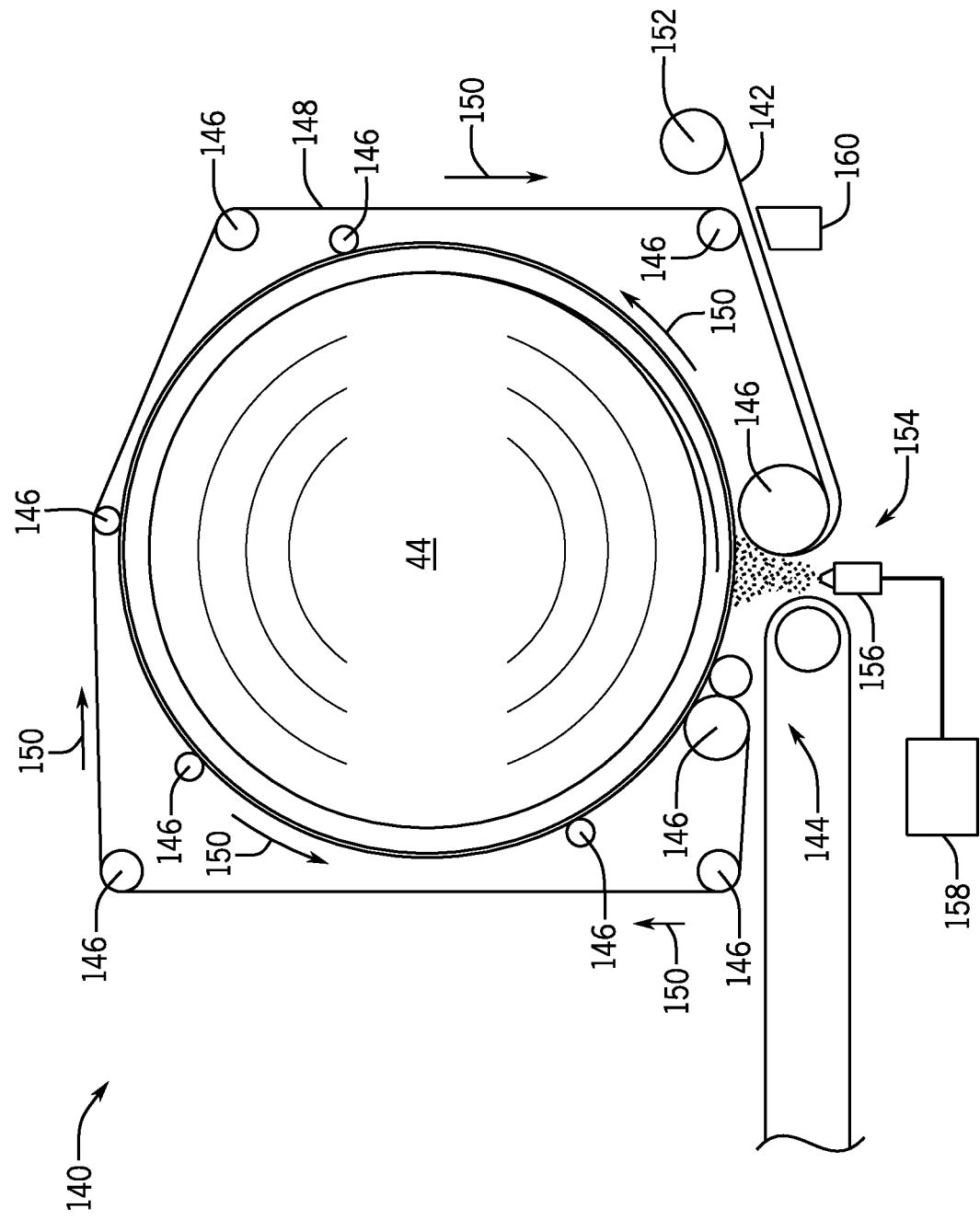
FIG. 5 is a schematic view of a bale wrapping system that may be employed in the agricultural implement of FIG. 1, in accordance with an aspect of the present disclosure.

FIG. 5 is a schematic view of a bale wrapping system 140 that may be employed in the agricultural implement 10 of FIG. 1. A bale wrap 142 is configured to wrap around a bale 44 (e.g., a bale of the agricultural product or a module of the agricultural product) formed by the packager or baler 20 (seen in FIG. 1) of the agricultural implement 10. As cotton or another agricultural product is harvested, the agricultural product flows into the baler 20. For example, cotton may be blown by the pneumatic system 18 into the baler 20. The cotton is then fed into a cavity 144 of the baler 20. The baler 20 includes a plurality of rollers 146 that support and/or drive rotation of one or more belts 148. For example, one or more rollers or wheels 146 engage the belts 148, which moves the belts 148 along the pathway defined by the rollers 146. The belts 148 circulate around the path defined by the rollers 146, as indicated by arrows 150. The movement of the belts 148 captures agricultural product from the storage housing 48 and draws it into the cavity 144 where the agricultural product is gradually built up to form the bale 44. As the agricultural product builds within the cavity 144 one or more of the rollers 146 move radially outward to accommodate the increasing size of the bale 44.

Once the bale 44 reaches a desired size, the bale wrapping system 40 wraps the bale 44 with a bale wrap 142. The bale wrap 142 may include cotton and/or other suitable materials (e.g., biodegradable, natural materials). In certain embodiments, the bale wrap 142 may include only cotton. Additionally, the bale wrap 142 may be a canvas, a fabric, a cloth, other material configurations, or a combination thereof.

The bale wrap 142 may be fed from a roll 152 and into contact with the bale 44 with the one or more rollers 146 and/or guides. As illustrated, the roll 152 may be placed behind the bale 44 in the direction of travel of the agricultural implement 10. In this way, the roll 152 may be fed in the opposite or substantially the opposite direction as that of the agricultural product. In some embodiments, the roll 152 may be fed from the bottom or the top, clockwise or counter-clockwise. Contact between the bale 44 and the bale wrap 142 enables the bale 44 to grip the bale wrap 142. The rotation of the bale 44 then draws the bale wrap 142 around the bale 44. In order to couple the bale wrap 42 to itself around the bale 44, the bale wrapping system 140 includes a gluing system 154. The gluing system 154 includes one or more sprayers 156 (e.g., spray nozzles) that spray an adhesive (e.g., TensorGrip 305, TensorGrip 307) onto the bale wrap 142 (e.g., one side of the bale wrap 142). The sprayers 156 are fed from a glue source 158 (e.g., storage tank). The gluing system 154 adds an adhesive layer to the bale wrap 142 enabling the bale wrap 142 to couple to itself. In other words a first portion of the bale wrap 142 couples (e.g., adheres) to a second portion (e.g., a backside and/or exterior surface of the wrapping layer that is wrapped around the bale 44) of the bale wrap 142 with the adhesive provided by the gluing system 60 as the first portion overlaps the second portion. The bale wrap 142 is then cut with a cutter or cutter system 160 to separate additional bale wrap 142 (e.g., a roll of bale wrap) from the bale wrap 142 surrounding the bale 44.

Figure 6:
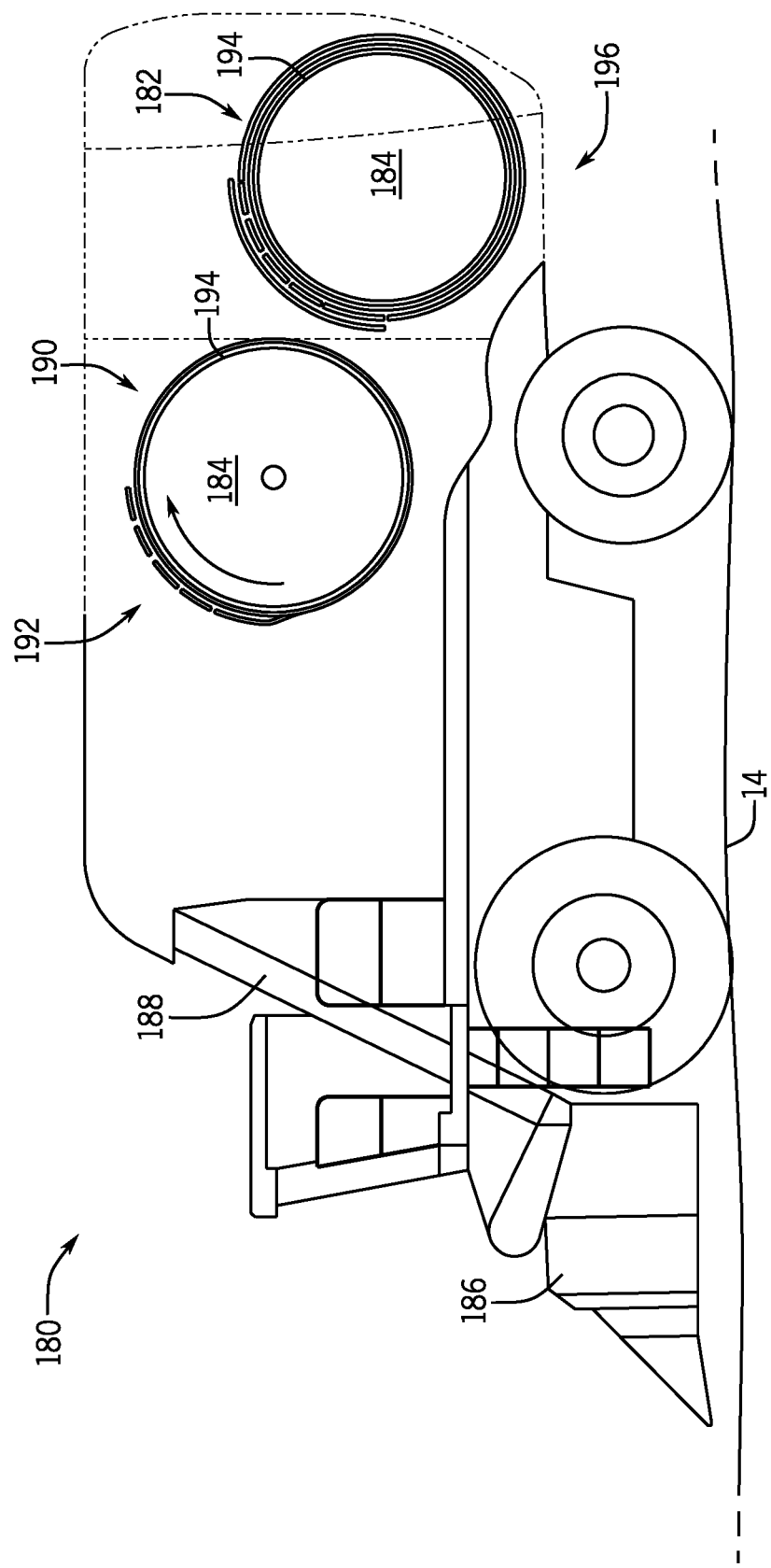
FIG. 6 is a side view of an embodiment of an agricultural implement with a wrap treatment system, in accordance with an aspect of the present disclosure.

FIG. 6 is a side view of an embodiment of an agricultural implement 180 with a wrap treatment system 182. The agricultural implement 180 is configured to harvest agricultural product from a field and to form the agricultural product into bales 184. For example, the agricultural implement 180 includes drums 186 configured to harvest the agricultural product from the field. Additionally, the agricultural implement 180 includes a pneumatic system 188 configured to move the agricultural product from the drums 186 to a packager or baler 190 (e.g., baler or module builder). The baler 190 is supported and/or mounted within or on the agricultural implement 180. As illustrated, the baler 190 may form the agricultural product into round bales 184. In certain embodiments, the baler 190 of the agricultural implement 180 may form the agricultural product into square bales, round bales, or another shape.

As described above, after forming the agricultural product into a bale 184, a bale wrapping system 192 of the agricultural implement 180 wraps the agricultural product with a bale wrap 194 to secure the agricultural product and to generally maintain a shape of the bale 184. As explained above the bale wrap 194 may be cotton and/or other suitable materials (e.g., biodegradable, natural materials). In certain embodiments, the bale wrap 194 may include only cotton. Additionally, the bale wrap 194 may be a canvas, a fabric, a cloth, other material configurations, or a combination thereof. These materials may not be water proof, water resistant, pest resistant, anti-microbial, etc. Accordingly, the agricultural implement 180 may include the wrap treatment system 182. The wrap treatment system 182 may add a protective coating to the bale wrap 194 and/or activate a protective layer previously applied to the bale wrap 194. For example, the bale wrap 194 may be treated with one or more substances (e.g., soya wax, cotton wax, sea weed, degradable plastic) during production of the bale wrap 194. The substance may be activated and/or react with another substance (e.g., tannic acid) to form a water repellent layer, pest resistant layer, anti-microbial layer, or a combination thereof.

The wrap treatment system 182 may spray and/or activate the protective coating on the bale wrap 194 while the bale 184 is within the baler 190 or after ejection of the bale 184 from the baler 190. For example, the wrap treatment system 182 may couple to a bale carrier 196 enabling the bale wrap 194 to be treated while the bale 184 is on the bale carrier 196.

Figure 7:
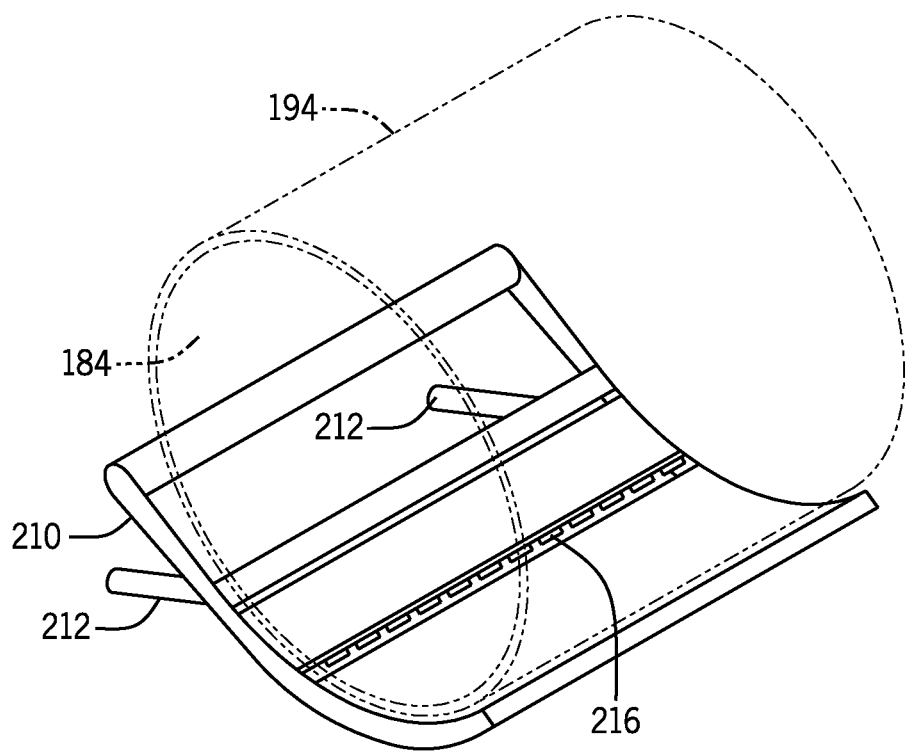
FIG. 7 is a perspective view of a wrap treatment system that may be employed with an agricultural implement, in accordance with an aspect of the present disclosure.
Figure 8:
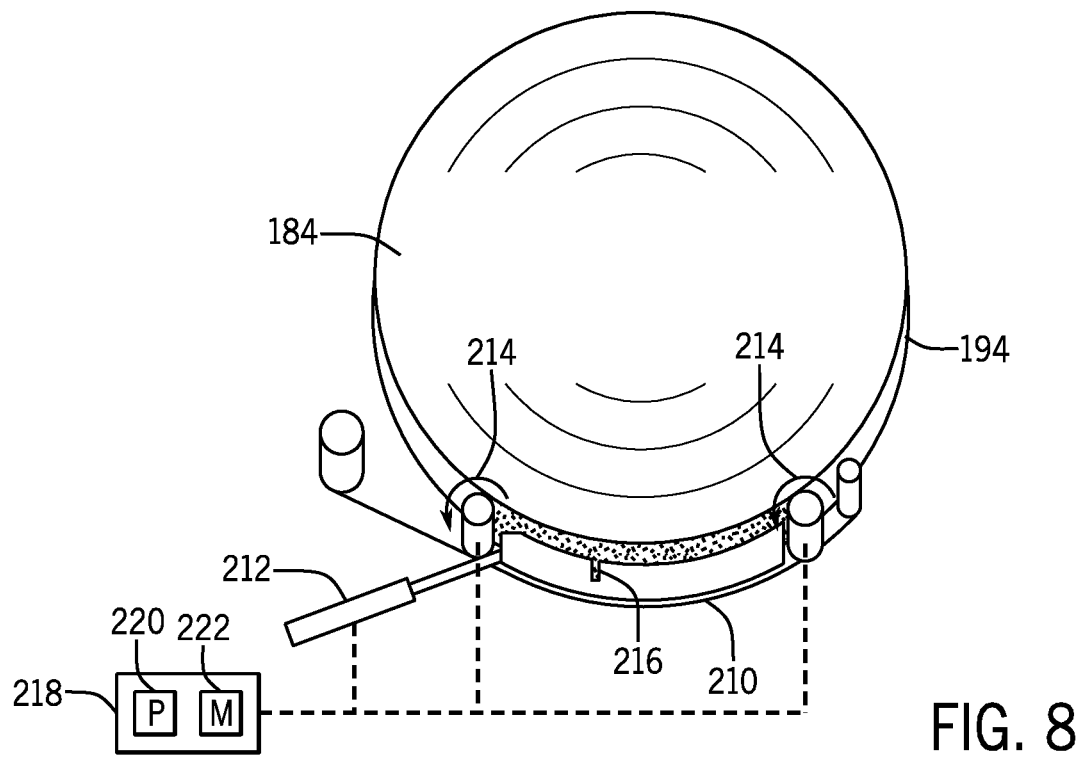
FIG. 8 is a side view of a wrap treatment system that may be employed with an agricultural implement, in accordance with an aspect of the present disclosure.

FIGS. 7 and 8 illustrate respective perspective and side views of the bale carrier 196 and the wrap treatment system 182. As illustrated, the bale carrier 196 includes a frame 210 that defines a curvilinear shape that supports or cradles the bale 184 after ejection from the baler 190. The bale carrier frame 210 is raised and lowered with one or more actuators 212 (e.g., hydraulic cylinders) to release the bale 184. For example, the actuators 212 may lower one side of the frame 210 to enable the bale 184 to roll off the bale carrier 196 and onto the field.

The wrap treatment system 182 couples to the bale carrier 196 enabling treatment of the bale wrap 194 and/or the application of a coating to the bale wrap 194. The wrap treatment system 182 includes one or more bale rollers 214 that rotate the bale 184 as it rests on the bale carrier 196. In operation, the bale rollers 214 rotate the bale 184 while one or more sprayers 216 (e.g., spray nozzles) spray a solution or substance onto the bale wrap 194. The bale rollers 214 completely rotate the bale 184 one or more times to ensure that the entire bale wrap 194 is treated before releasing the bale 184 onto the field.

As explained above, the wrap treatment system 182 may spray a solution that activates substances imbedded or previously added to the bale wrap 194. For example, the wrap treatment system 182 may spray tannic acid, which then activates a compound that is activated with the spray previously placed in the bale wrap 194 to produce a water repellent bale wrap 194. In some embodiments, the fluid sprayed by the sprayers 216 may create a pest resistant, anti-microbial, and/or water repellent bale wrap 194 after reacting with other substances in bale wrap 194. In some embodiments, the wrap treatment system 182 may spray the water repellent layer (e.g., wax), pest resistant layer, anti-microbial layer, etc. onto the bale wrap 194.

The wrap treatment system 182 may include a controller 218. The controller 218 may include a processor 220 that executes instructions stored on a memory 222 to control the wrap treatment system 182. The controller 218 may control the one or more rollers 214, sprayers 216, and actuators 212 to ensure that the bale wrap 194 is completely sprayed before the bale 184 is released by the agricultural implement 180. More example, the controller 218 may monitor how many revolutions the bale 184 has made while the sprayers 216 sprayed the coating. For example, each bale 184 may be sprayed for 1, 2, 3, or more complete revolutions in order to activate and/or produce the desired protective treatment layer/coating on the bale 184. The revolutions of the bale 184 may be determine by the run time of the rollers 214 and/or by sensors that detect the revolutions of the rollers 214.

Figure 9:
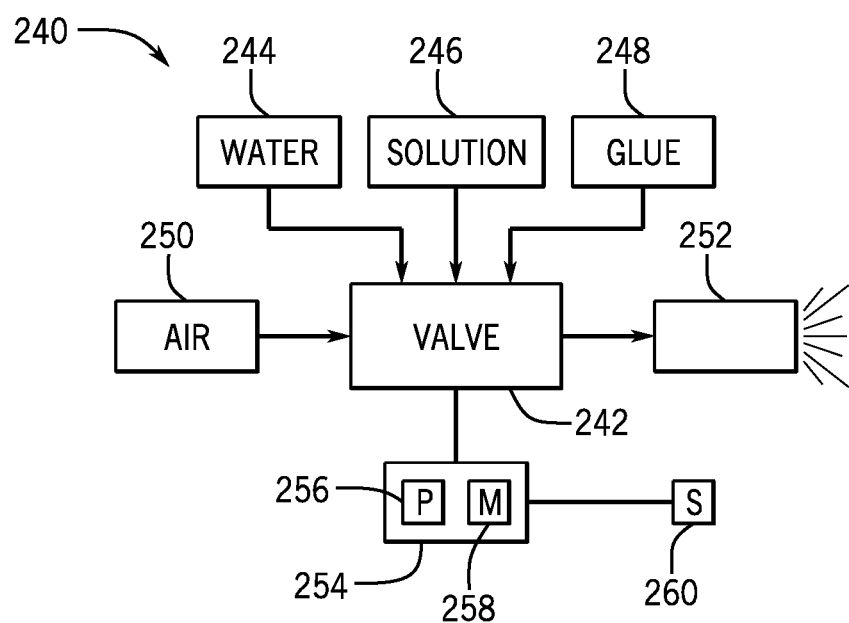
FIG. 9 is a schematic spray system that may be employed with an agricultural implement, in accordance with an aspect of the present disclosure.

FIG. 9 is a schematic of a spray system 240 that may be used with the agricultural implement 10, 180. For example, the glue system 60 may include the spray system 240. The spray system 240 includes a valve 242 capable of receiving various fluids. For example, the valve 242 may couple to a water source 244, a chemical solution source 246, a glue source 248, and an air source 250. These different fluids may be mixed or flow alone through the valve 242 before flowing to a nozzle 252 where the fluid is sprayed or released. By enabling multiple fluids to flow through the valve 242 and therefore through the nozzle 252, the spray system 240 is able to clean itself as well as other equipment on the agricultural implement 10, 180.

As explained above, agricultural material is accumulated and then formed into a bale. In order to maintain the agricultural material in a bale, the bale is wrapped with a bale wrap (e.g., cotton). In order to couple the bale wrap to itself, a glue may be used. In order to clean the glue out of the spray system 240 and/or out of other locations on the agricultural implement air, water, chemical solutions (e.g., citric acid, glue solvent), or a combination therefore may be used. For example, after each bale formation and wrapping, the spray system 240 may purge glue from the spray system 240 by blowing air (e.g., compressed air) through the nozzle 252. In some embodiments, a combination of air, water, and a chemical solution may be used to clean the spray system 240 and/or the agricultural implement 10, 180. For example, water and a chemical solution (e.g., citric acid, glue solvent) may be combined and driven through the sprayer 252. After driving the water and chemical solution through the nozzle 252, the compressed air may be released to drive the excess water and chemical solution out of the sprayer 252. Actuation of the valve 242 may be controlled with a controller 254. The controller 254 includes a processor 256 that executes instructions on a memory 258 to control the valve 242.

In some embodiments, the controller 254 may use sensor feedback to control the valve 242. For example, a sensor(s) 260 (e.g., camera, pressure sensor, chemical sensor) may emit a signal indicative of clogging of the sprayer, excess glue on components, or a combination thereof. In response to the signal from the sensor(s) 260, the controller 254 may direct air, water, and/or chemical solution through the valve 242. In some embodiments, the controller 254 may control the valve 242 based on a completed step in the baling process. For example, after the bale is ejected from the baler, the controller 254 may flush the spray system 240 with water and/or chemical solution, as well as spray air. In some embodiments, the controller 254 may actuate the valve 242 to clean the spray system 240 after several bales have been produced (e.g., 1, 2, 3, 4, 5, or more).

Figure 10:
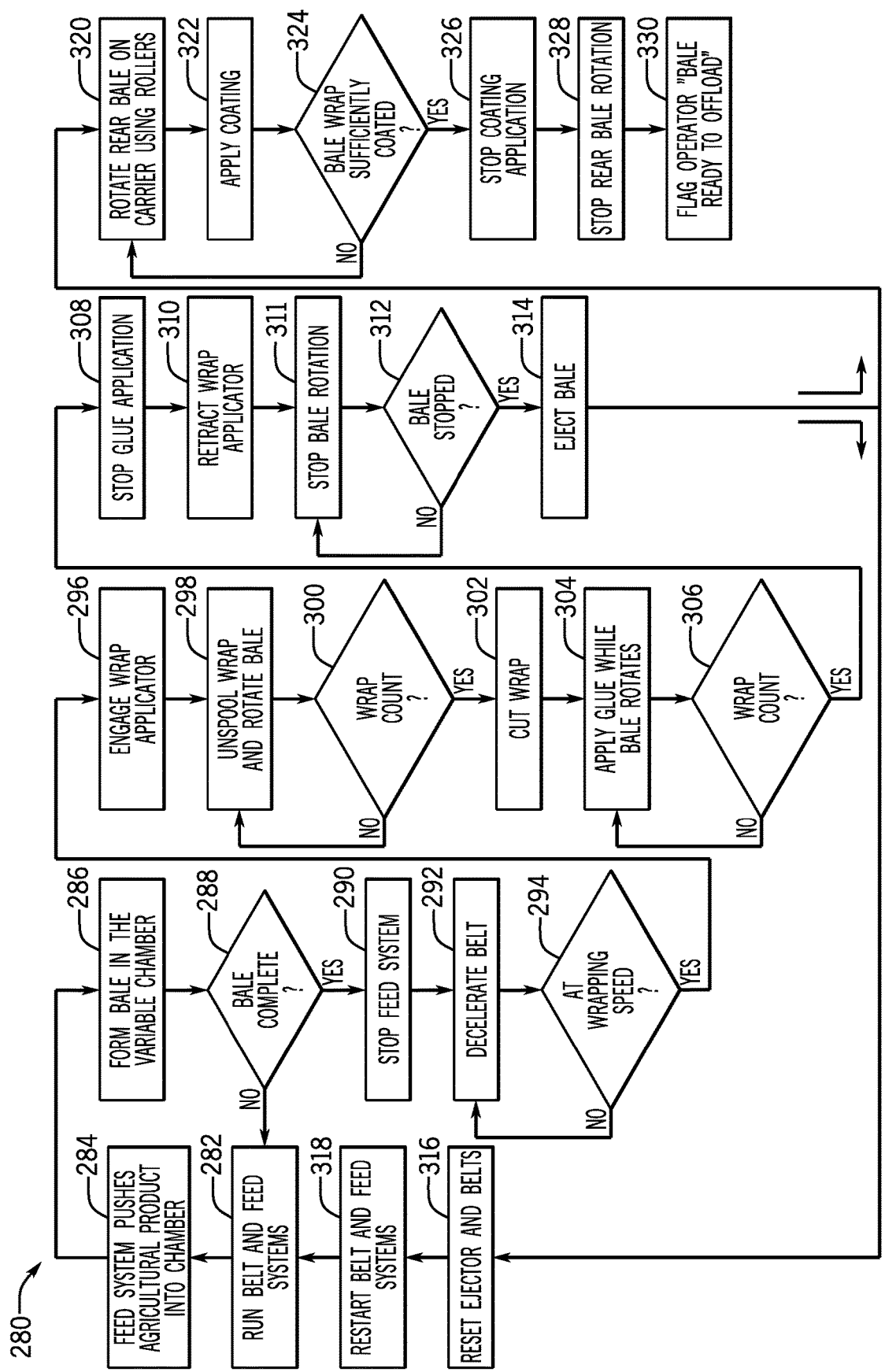
FIG. 10 is a flow chart of a method for wrapping a bale and for treating the wrap, in accordance with an aspect of the present disclosure.

FIG. 10 is a flow chart of a method 280 for wrapping a bale and for treating the bale wrap. The method 280 begins by starting belt and feed systems on the agricultural implement, step 282. The method 280 then feeds agricultural product (e.g., cotton) into a variable size chamber of the agricultural implement with the feed system, step 284. The method 280 then forms the agricultural product into a bale (e.g., square, round) in the variable size chamber, step 286. As the variable size chamber fills with the product the method determines if the bale is complete, or in other words reached a desired size, step 288. If the bale has not reached the desired size, the method 280 returns to step 282. If the bale is the desired size, the method 280 stops the feed system, step 290. The method 280 may then decelerate the belt(s), step 292. The method 280 then detects if the belt is at a desired wrapping speed, step 294. If the belt is not at the desired speed, the method 280 returns to step 292 and continues to decelerate the belt. If the belt is at the desired speed, the method 280 may engage the wrap guide or applicator (i.e., if the baler includes a wrap guide or applicator) to engage the bale wrap with the bale, step 296. The method 280 then determines if the bale wrap has been wrapped sufficiently around the bale (e.g., 1, 1.5, 2, 2.5, 3, or more wraps around the bale), step 300. If the bale was insufficiently wrapped, the method 280 returns to step 298. If the bale was sufficiently wrapped the method 280 cuts the bale wrap, step 302. The method 280 then applies glue to the bale wrap as the bale rotates, step 304. It should be understood that glue may be applied to the bale wrap before the wrap is cut. The method 280 then determines if a sufficient portion of the bale wrap was sprayed with glue, step 306. If the portion of the bale wrap sprayed with glue is less a desired portion, the method 280 returns to step 304. If the sprayed portion is sufficient, the method 280 continues by stopping the spray of glue, step 308. The method 280 may then retract the wrap guide or applicator and stop rotation of the bale, step 310 and 312. The method 280 may then eject the bale from the agricultural implement, step 314. After ejecting the bale, the method 280 may reset the ejector and belts to begin the bale formation process again, step 316. After resetting the ejector and belts, the method 280 restarts the belt and feed systems, step 318.

For the bale that was ejected, the method 280 may also treat and/or coat the bale wrap. For example, after ejecting the bale, the bale may be received by a bale carrier. The method 280 may then rotate the bale on the bale carrier with one or more rollers, step 320. As the bale rotates on the bale barrier, the method 280 may apply a coating to the bale wrap (e.g., water repellent coating, insect repellent coating, anti-microbial coating), step 322. The method 280 then determines if the bale wrap was sufficiently coated by counting the number of revolutions of the bale, (e.g., 1, 2, 3, or more revolutions), step 324. If the bale wrap was insufficiently coated, the method returns to step 322. If the bale was sufficiently coated, the method 280 stops applying the coating, step 326. The rotation of the rollers may then also be stopped, step 328. The method 280 may then notify the operator that the bale is ready for offload, step 330.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. An agricultural implement, comprising:
   a baler configured to bale an agricultural product, the baler comprising:
      a belt configured to rotate to form a bale out of the agricultural product, and wherein the belt rotates the bale within the baler;
   a bale wrapping system configured to wrap the bale with a wrapping layer of a bale wrap, the bale wrapping system comprising:
      a glue system configured to spray a layer of glue onto the wrapping layer, wherein the layer of glue enables a first portion of the wrapping layer to couple to a second portion of the wrapping layer; and
   a bale wrap treatment system configured to spray a fluid onto the wrapping layer to form a coating on the wrapping layer;
   wherein the glue system comprises a wrap guide configured to spray the layer of glue onto the wrapping layer, and the wrap guide is configured to change position to drive the bale wrap into contact with the bale to enable the bale to grip the bale wrap, such that rotation of the bale draws the bale wrap around the bale.

2. The agricultural implement of claim 1, wherein the bale wrap is cotton and is formed as a canvas, fabric, cloth, or a combination thereof.

3. The agricultural implement of claim 1, wherein the wrap guide comprises one or more nozzles configured to spray the layer of glue onto the wrapping layer.

4. The agricultural implement of claim 1, comprising a cutting system configured to cut the bale wrap to a length enabling the first portion of the wrapping layer to overlap with the second portion of the wrapping layer around the bale.

5. The agricultural implement of claim 1, wherein the coating is a water repellent coating, an insect repellent coating, an anti-microbial coating, or a combination thereof.

6. The agricultural implement of claim 1, wherein the bale wrap treatment system couples to a bale carrier.

7. The agricultural implement of claim 6, comprising an actuator configured to move the bale carrier to release the bale.

8. The agricultural implement of claim 6, wherein the bale carrier is configured to receive the bale wrapped with the bale wrap from the bale wrapping system.

9. The agricultural implement of claim 8, wherein the bale wrap treatment system comprises a bale roller configured to rotate the bale on the bale carrier.

10. The agricultural implement of claim 9, wherein the bale wrap treatment system comprises a sprayer configured to spray the fluid onto the bale wrap to form the coating on the bale wrap as the bale rotates on the bale carrier.

11. The agricultural implement of claim 1, comprising a controller configured to control a sprayer of the bale wrap treatment system and to detect an amount of rotation of the bale.

12. The agricultural implement of claim 1, wherein the wrap guide is configured to change position to drive the bale wrap over or below the wrap guide into contact with the bale.

13. The agricultural implement of claim 1, wherein the bale wrap comprises one or more chemicals that react with the fluid to form the coating.

14. The agricultural implement of claim 1, comprising a controller configured to detect a size of the bale, wherein in response to the size of the bale the controller is configured to release the bale wrap that surrounds the bale, and wherein the controller is further configured to detect an amount of bale wrap surrounding the bale and in response to the amount of the bale wrap surrounding the bale activate the glue system to spray the layer of glue onto the bale wrap to couple the bale wrap around the bale.

15. A bale wrapping system, comprising:
   a belt configured to rotate to form and drive rotation of a bale of agricultural product, wherein the bale is configured to be wrapped with a wrapping layer of a bale wrap while rotating on the belt, such that a first portion of the wrapping layer overlaps a second portion of the wrapping layer while disposed on the belt; and
   a glue system configured to spray a layer of glue onto the wrapping layer, wherein the layer of glue enables the first portion of the wrapping layer to couple to the second portion of the wrapping layer;
   wherein the glue system comprises a wrap guide configured to spray the layer of glue onto the wrapping layer, and the wrap guide is configured to change position to drive the bale wrap into contact with the bale to enable the bale to grip the bale wrap, such that rotation of the bale draws the bale wrap around the bale.

16. The bale wrapping system of claim 15, wherein the wrap guide comprises one or more nozzles configured to spray the layer of glue onto the wrapping layer.

17. The bale wrapping system of claim 15, comprising a cutting system configured to cut the bale wrap to a length enabling the first portion of the wrapping layer to overlap with the second portion of the wrapping layer around the bale.

18. The bale wrapping system of claim 17, wherein the cutting system is upstream from the glue system in a direction that the bale wrap unrolls.

19. The bale wrapping system of claim 15, wherein the bale wrap is cotton and is formed as a canvas, fabric, cloth, or a combination thereof.

20. The bale wrapping system of claim 15, wherein the wrap guide is configured to change position to drive the bale wrap over or below the wrap guide into contact with the bale.

21. A bale wrap treatment system, comprising:
a bale carrier configured to receive a bale wrapped with a bale wrap from a bale wrapping system;
a bale roller configured to rotate the bale on the bale carrier; and
a sprayer configured to spray a fluid onto the bale wrap to form a coating on the bale wrap as the bale rotates on the bale carrier;
wherein the bale wrap comprises one or more chemicals that react with the fluid to form the coating.

22. The bale wrap treatment system of claim 21, wherein the coating is a water repellent coating, an insect repellent coating, an anti-microbial coating, or a combination thereof.

23. The bale wrap treatment system of claim 21, comprising an actuator configured to move the bale carrier to release the bale.

24. The bale wrap treatment system of claim 21, comprising a controller configured to control the sprayer and to detect an amount of rotation of the bale.

* * * * *